United States Patent [19]

Coughlan et al.

[11] 4,017,876
[45] Apr. 12, 1977

[54] SHUTTER LATCH SYSTEM WITH AUTOMATIC RELEASE FOR SHOCK DAMPING MEMBER

[75] Inventors: Edward H. Coughlan, Dedham; George D. Whiteside, Lexington, both of Mass.

[73] Assignee: Polaroid Corporation, Cambridge, Mass.

[22] Filed: Jan. 13, 1976

[21] Appl. No.: 648,661

[52] U.S. Cl. .............................. 354/230; 354/268
[51] Int. Cl.² ..................... G03B 9/08; G03B 17/38
[58] Field of Search .......... 352/244; 354/230, 235, 354/261, 268, 32

[56] References Cited

UNITED STATES PATENTS

| | | | |
|---|---|---|---|
| 3,358,572 | 12/1967 | Steisslinger | 354/268 |
| 3,362,311 | 1/1968 | Singer | 354/268 |
| 3,820,128 | 6/1974 | Burgarella et al. | 354/32 |

*Primary Examiner*—Donald A. Griffin
*Attorney, Agent, or Firm*—Edward S. Roman

[57] ABSTRACT

This invention relates to an improvement to a photographic camera of the type having an automatic shutter latch mechanism which may be released in response to initial shutter blade movement resulting from energization of the shutter drive means and which may thereafter be moved into position to accommodate relatching of the shutter blades in response to film advancement. The shutter latch mechanism additionally includes a shock stabilizing arrangement to inhibit the accidental unlatching of the shutter blade mechanism resulting from shutter blade movement occasioned through extraneous vibration, sudden shock, or otherwise. The improvement resides in the automatic shutter latch mechanism which includes means responsive to the displacement of the latch when effecting the release of the shutter blade mechanism for inhibiting the operative influence of the shock stabilizing means on the blade mechanism until the blade mechanism is returned to its arrangement wherein it is retainable by the latch.

6 Claims, 12 Drawing Figures

SHUTTER LATCH SYSTEM WITH AUTOMATIC RELEASE FOR SHOCK DAMPING MEMBER

BACKGROUND OF THE INVENTION

This invention relates generally to a photographic camera with improved automatic shutter latch and, more particularly, to a photographic camera having an improved automatic shutter latch with stabilizing means for prohibiting the accidental release of the shutter blades through sudden shock or otherwise together with means for inhibiting the operative influence of the stabilizing means on the blade mechanism during ordinary blade movement.

Electrically driven exposure control systems are advantageous in that they minimize operator requirements of shutter recocking, etc. and are particularly suited for electronic control. For conversation of power, such systems require provision of a stable deenergized shutter condition when the camera is not undergoing exposure operations. An exemplary system of this type is described in U.S. Pat. No. 3,820,128 issued to J. T. Burgarella, et al on June 25, 1974 wherein a compact, automated single lens reflex camera is described, and which includes a shutter diaphragm system having shutter blades mechanically biased to an open (viewing) position and electrically biased to a closed position. Advantageously, the exposure system of the above-noted patent is electrically sequenced to provide a precise control over the exposure operation. That is, both the initiation and termination of the exposure interval are electrically, rather than mechanically, determined and, accordingly, may be precisely controlled. However, while the system is particularly adapted for through the lens viewing and provides a normally open shutter, it can be understood that it would also be desirable to provide a normally closed arrangement without compromising the system advantages.

Toward this end, there is described in a copending application for U.S. Patent Serial No. 554,777 entitled "Photographic Apparatus With Sequencing System," by B. Johnson and G. Whiteside, filed March 3, 1975, a latching mechanism provided in order to maintain the shutter blade mechanism in its light blocking position without having to maintain a solenoid in its energy consuming energized state. The means described in the aforementioned patent application for latching and unlatching the shutter blade mechanism comprises a forwardly extending finger arranged for reciprocal movement in correspondence with a film advancing mechanism. The finger is adapted to extend into the locus of movement of the blade mechanism when the film advance mechanism is in its forwardmost position. The shutter blade elements are of the so-called "scanning type" embodying a pivotal walking beam whereby the forward end of the finger provides a rearwardly movable stop, in the path of travel, against which the lower end of the walking beam abuts to prevent clockwise rotation of the walking beam under the influence of a biasing spring. The shutter blade mechanism is unlatched in response to the predetermined rotation of the sequencing gear which causes the film advance mechanism and its associated finger latch to move rearwardly under the influence of another biasing spring. This rearward movement retracts the finger from the path of travel of the walking beam thereby permitting rotation of the beam about its pivot towards the shutter open position. During the course of the cycle of camera operation, the film advance mechanism again moves forwardly to cause the finger to extend through the locus of rotation of the walking beam to relatch the shutter thereby allowing the solenoid to be deenergized.

Another exposure control system utilizing electrically controlled shutter blade elements employing a latch for holding the blades in a light blocking position is more fully described in a copending application for U.S. Patent Serial No. 608,663, entitled "Electro-Mechanical Shutter System Having Mechanical Latch," by L. Douglas, filed Aug. 8, 1975. In accordance with the general concept of the aforementioned invention, the exposure control system includes a reliable shutter latching arrangement which requires shutter actuation for release. Thus, the exposure control system includes a shutter latch released in response to combined electrical and mechanical actuation of the exposure control system. A mechanical shutter latch arrangement is unlocked just before or simultaneously with energization of the exposure control system and then subsequently released in response to initial shutter blade movement resulting from energization of the electrical drive element.

Still another exposure control system having an automatic shutter latch mechanism which may be released in response to initial shutter blade movement resulting from energization of the shutter drive means and which may thereafter be moved into position to accommodate relatching of the shutter blades in response to film advancement is disclosed in a copending application for U.S. Patent Ser. No. 648,225 by Bruce K. Johnson and George D. Whiteside filed Jan. 13, 1976 in common assignement. The shutter latch mechanism of the aforementioned patent application includes a shock stabilizing arrangement to inhibit the accidental unlatching of the shutter blade mechanism resulting from shutter blade movement occasioned through extraneous vibration, sudden shock or otherwise, and not through actuation of the shutter drive means. The stabilizing arrangement, however, may interfere with normal operations of the shutter blade mechanism.

Therefore it is a primary object of this invention to provide an automatic shutter latch mechanism stabilized against accidental release through sudden shock by means not interfering with ordinary operation of the shutter blades during an exposure interval.

It is also an object of this invention to provide an automatic shutter latch mechanism having stabilizer means associated therewith for inhibiting the accidental release of the shutter blade mechanisms through sudden shock or otherwise, together with means for inhibiting the operative influence of the stabilizer means during ordinary operation of the shutter blade elements in the course of a photographic exposure interval.

Other objects of the invention will in part be obvious and will in part appear hereinafter.

SUMMARY OF THE INVENTION

This invention relates to an improvement in a photographic camera of the type having means for mounting photographic film material at a given focal plane and a blade mechanism together with means for mounting the blade mechanism for displacement between at least one blocking arrangement precluding transmission of scene light to the focal plane and an unblocking arrangement defining at least one aperture value structured for transmission of scene light to the focal plane. Actuable drive means are also included for displacing the blade mechanism between its arrangements. Latch means initially retain the blade mechanism in one of its arrangements and means which are at least in part electrically energizable are provided for actuating the drive means to effect the displacement of the blade mechanism from its arrangement wherein it is retainable by the latch means to another of its arrangements and then back to its arrangement wherein it is retainable by the latch means to define an exposure cycle of the blade mechanism. The latch means are structured to be displaced responsive to the actuation of the drive means to effect release of the blade mechanism to facilitate the movement of the blade mechanism under the influence of the drive means to define the exposure cycle.

The blade mechanism is also susceptible to sudden movements, shocks or otherwise which cause the blade mechanism to move from its arrangement wherein it is retainable by the latch means to another of its arrangements. In order to inhibit this response of the blade mechanism to shocks, there is provided a shock stabilizing or damping means responsive to such shocks of the blade mechanism for prohibiting the release of the blade mechanism by the latch means. The improvement resides in providing means for inhibiting the operative influence of the stabilizing means during ordinary operation of the shutter blade elements in the course of a photographic exposure interval.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

FIG. 10 is a fragmented front view of still another portion of the exposure control mechanism of FIG. 2 showing another mode of operation;

FIG. 12 is a fragmented front view of an alternate embodiment of a portion of the exposure control system of FIG. 2.

DESCRIPTION OF THE PREFERRED EMBODIMENT

Figure 1:
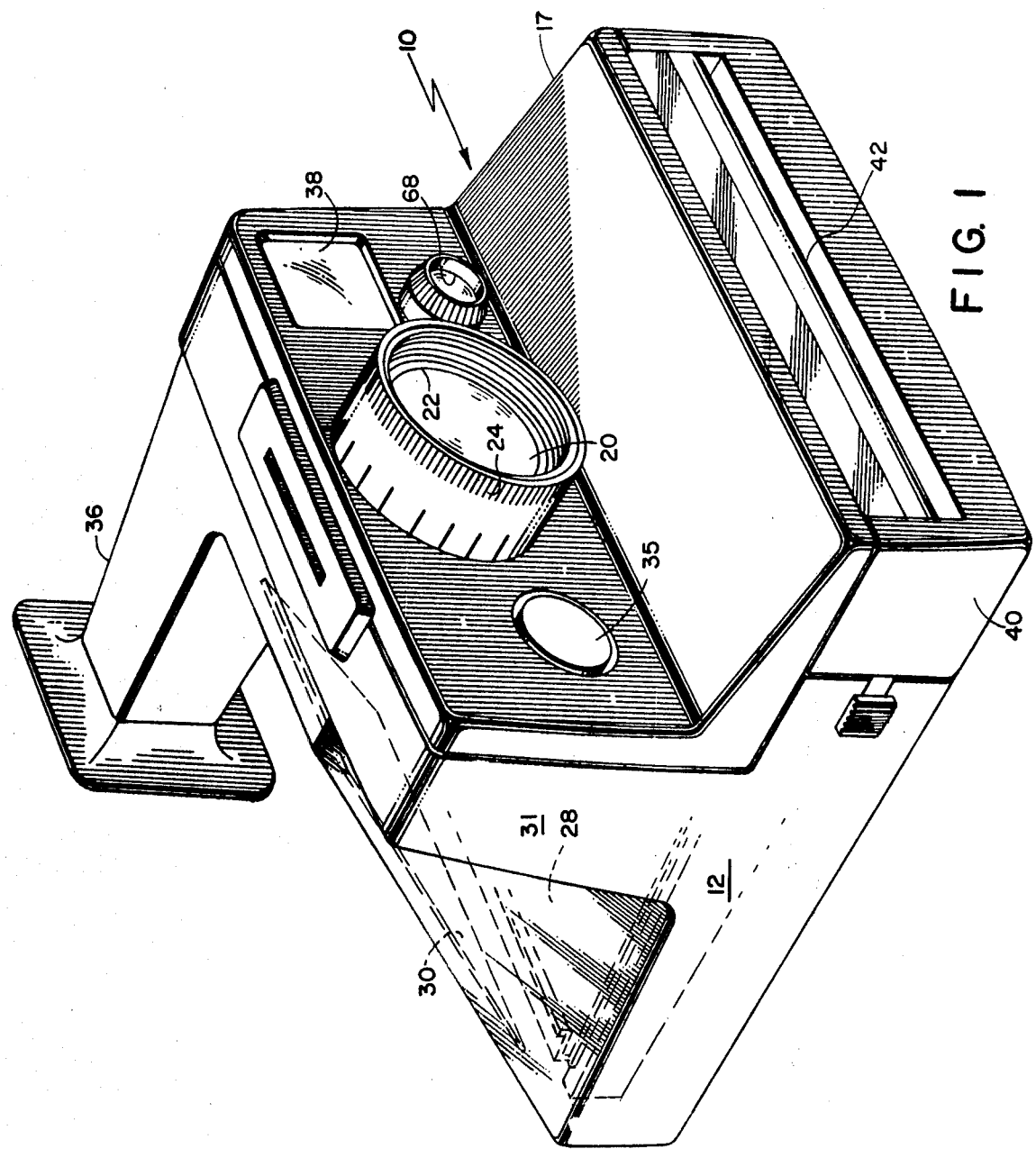
FIG. 1 is a perspective view of a camera embodying the features of this invention.
Figure 2:
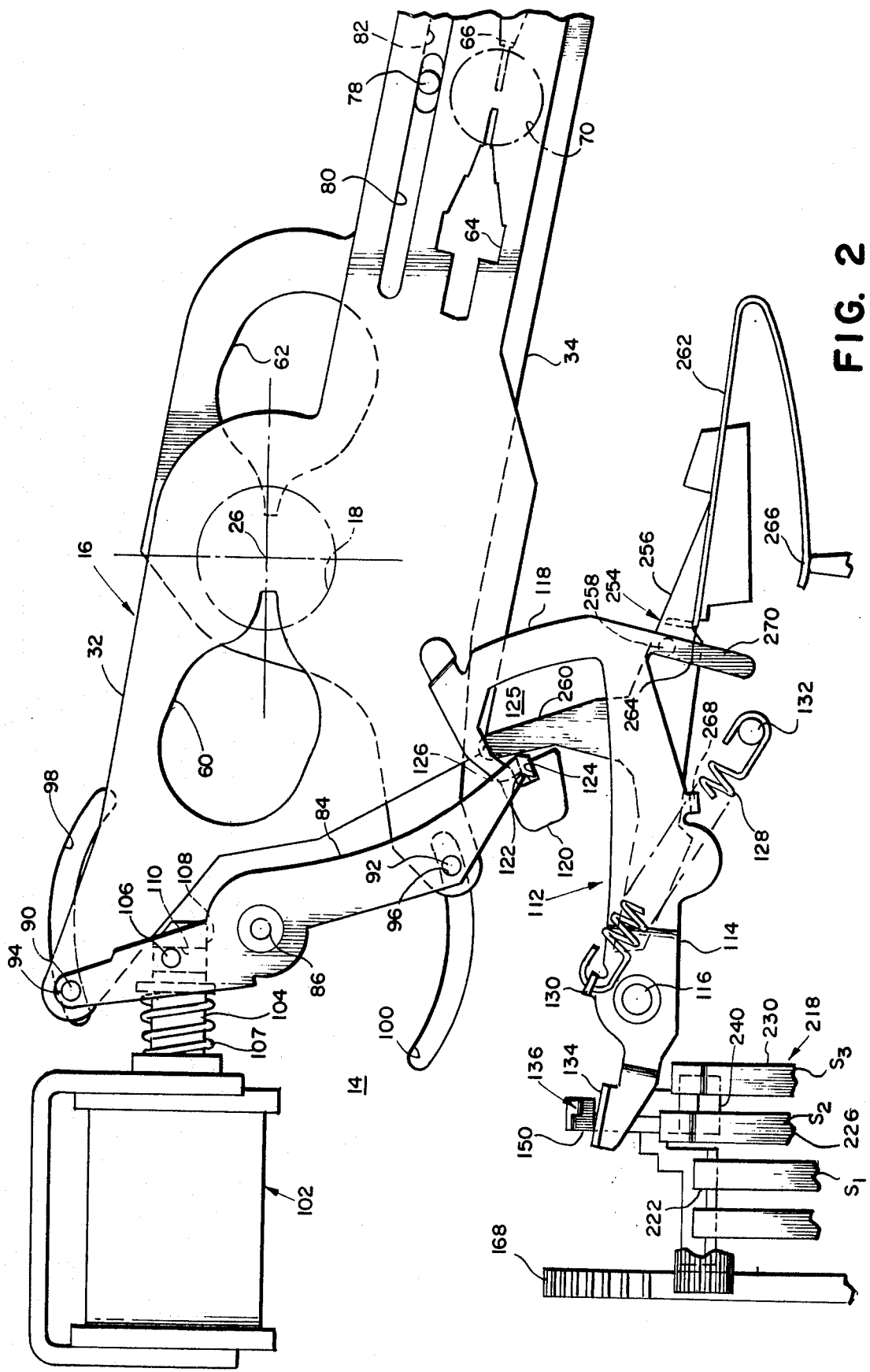
FIG. 2 is a front cross-sectional view of a portion of the exposure control mechanism of this invention.

Referring now to FIGS. 1 and 2, it can be seen that the exposure control system of this invention is associated with a photographic apparatus 10 contained within a housing shown generally at 12. A baseblock casting 14 is fixedly stationed within the housing 12 and selectively machined to support the various components of an exposure mechanism shown generally at 16. Surrounding the front and top of the baseblock casting 14, there is provided a cover section 17 which includes at least one opening through which extends a manually adjustable focus bezel 24. Centrally disposed within the baseblock casting 14, there is provided a light entering exposure opening 18 which defines the maximum available exposure aperture for the system.

Figure 3:
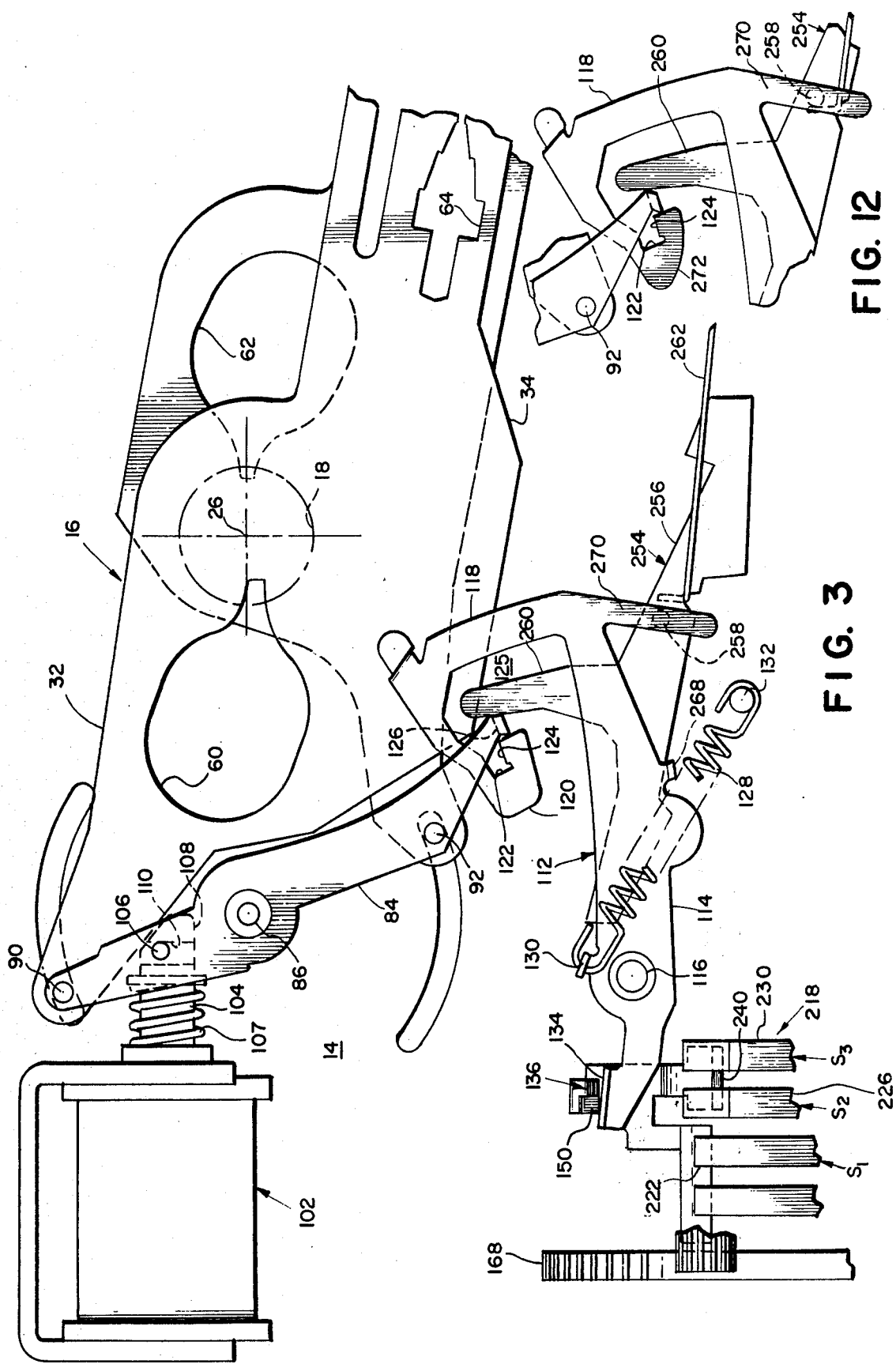
FIG. 3 is a front cross-sectional view of the exposure control mechanism of FIG. 1 in a different mode of operation.
Figure 4:
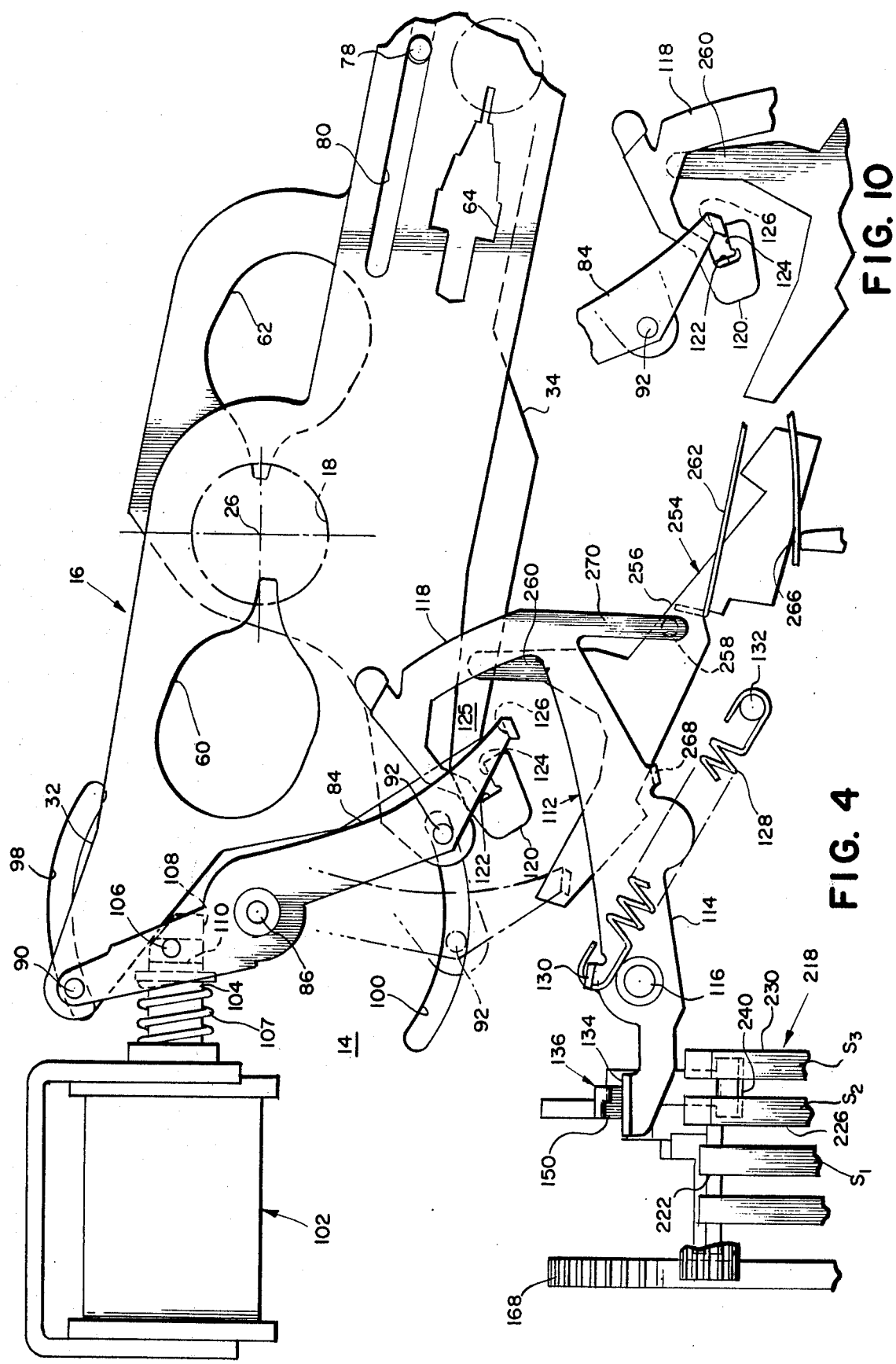
FIG. 4 is a front cross-sectional view of the exposure control mechanism of FIG. 1 in still another mode of operation.

An objective or taking lens 20 is provided in overlying relation to the light entering opening 18 wherein the objective lens 20 may comprise a plurality of elements retained in predetermined spaced relation by a cylindrical lens mount 22 which is externally threaded for toothed engagement within the internally threaded focus bezel 24. As is readily apparent focus bezel 24 is made rotatable with respect to the front cover section 17 to provide translational movement of the elements of lens 20 along the center axis 26 of the optical path of the housing 12. As is readily apparent, the central optical axis 26 is illustrated in FIGS. 2–4 as being normal to the plane of the drawing. Thus, rotation of focus bezel 24 may be carried out by manual rotation to provide displacement of the elements of objective lens 20 for focusing of image carrying rays through the light entering exposure opening 18 to a rearwardly positioned film plane 28 by way of a reflecting mirror 30 all of which are stationed within a suitable light tight film exposure chamber 31 within the housing 12.

Intermediate the objective lens 20 and light entering exposure opening 18, there is provided a shutter mechanism including two overlapping shutter blade elements 32 and 34 of the so-called "scanning type" which will be subsequently described in greater detail herein. Extending from the front cover section 17, there is provided a photographic cycle initiating button 35, the depression of which commences the exposure interval by ultimately effecting the release of the shutter blade elements 32 and 34 in a manner to be subsequently described herein.

The housing section 12 may include an integrally molded viewfinder housing 36 extending rearwardly from the front cover section 17. The viewfinder housing 36 affords protection to internal components positioned therein and enables a user to use and frame a desired subject of scene through a window 38 included within the front cover section 17.

A film loading access door 40 including a film withdrawal slot 42 transversely disposed therein is pivotally mounted for movement between positions blocking and unblocking an open end of the chamber 31 included within the housing 12 for receiving and supporting a film cassette or container 44 therein. The cassette 44 encloses an assemblage including a plurality of film units 46 and a dark slide 48 superpositioned thereto for preventing exposure of a forwardmost film unit prior to insertion of the film cassette 44 into the chamber 31.

The film units 46 are multilayered structures including one or more photosensitive image receiving layers arranged in superposed relation and a rupturable pod 45 containing a supply of fluid processing composition attached to a leading end of the film unit 46. The film cassette 44 including the assemblage is similar to that disclosed and defined in U.S. Pat. No. 3,874,875, issued to E. H. Land on Apr. 1, 1975. The film units 46 included in the assemblage represent a general class of "integral type" self-developing type film units similar to that described in U.S. Pat. No. 3,415,644 issued to E. H. Land on Dec. 10, 1968. The film cassette 44 is shown in position within the film receiving chamber 31 of the camera 10 in FIGS. 6 and 7. The cassette 44 has a general tapered rectangular shape having a forward wall 50 including an exposure aperture (not shown) therein which is generally coextensive with the photosensitive area of the underlying film unit 46 contained within the cassette 44. Once the cassette 44 has been properly positioned within the chamber 31, the darkslide cover 48 must be removed prior to commencing a first photographic cycle whereupon the forwardmost film unit 46, subsequent to exposure, is advanced through an elongated film exit slot 52 disposed transversely within a leading end wall 54 of the film cassette 44. As the forwardmost member advances through the exit slot 52, it enters into the bite of a pair of juxtaposed pressure applying members or rollers 56 and 58 mounted adjacent the film withdrawal slot 42.

The film loading access door 40 is pivotally connected to housing section 12 in such a manner so as to allow the access door 40 and the rollers 56 and 58 to be pivoted downwardly to provide access to the film receiving chamber 31 for loading and unloading a film cassette 44. A detailed description of the manner in which the film loading access door and rollers 56 and 58 are coupled to the remainder of the camera 10 may be found in a copending application Ser. No. 582,720, filed on June 2, 1975, in the name of Andrew S. Ivester entitled "A Mounting Apparatus For a Spreader Roller Assembly." The rollers 56 and 58 are suitably mounted within the access door 40 by a mounting bracket (not shown).

A pair of scene light admitting primary apertures 60 and 62 are provided respectively in the blade elements 32 and 34 to collectively define a progressive variation of effective aperture openings in accordance with simultaneous longitudinal and lateral displacement of one blade element with respect to the other blade element in a manner as is fully described in a U.S. Patent Application Ser. No. 485,128 entitled "Camera With Pivoting Blades" by George D. Whiteside, filed July 2, 1974, and assigned in common herewith. The apertures 60 and 62 are selectively shaped so as to overlap the light entering exposure opening 18 thereby defining a gradually varying effective aperture size as a function of the position of the blade elements 32 and 34.

Each of the blades 30 and 32 may additionally be configured to have corresponding photocell sweep secondary apertures shown respectively at 64 and 66. Secondary apertures 64 and 66 may be configured in correspondence with the shapes of scene light admitting primary apertures 60 and 62. As is readily apparent, the secondary apertures 64 and 66 also move in correspondence with the primary apertures 60 and 62 to define a small secondary effective aperture for admitting the passage of scene light transmitted through a photocell aperture 68 in front cover section 17 of housing 12, from the scene being photographed.

Scene light admitted by the photocell secondary apertures 64 and 66 is thereafter directed to a light detecting station shown generally at 70. The light detecting station includes a photoresponsive element 72 which cooperates with a light integrating capacitor 74 together with light integrating and control circuitry 76 as is more fully described in a copending application for U.S. Patent Serial No. 619,384 entitled "Exposure Control System With Fill-Flash Race Condition" by E. K. Shenk, filed Oct. 3, 1975. In this manner, the exposure interval can be terminated as a function of the amount of light received through the secondary effective aperture defined by the overlapping photocell sweep apertures 64 and 66.

Projecting from the baseblock casting 14 at a location spaced laterally apart from the light entering exposure opening 18, is a pivot pin or stud 78 which pivotally and translatably engages elongate slots 80 and 82 formed in respective shutter blade elements 32 and 34. Pin 78 may be integrally formed with the baseblock casting 14 in blade elements 32 and 34 may be retained in engaging relation with respect to the pin 78 by any suitable means such as peening over the outside end of pin 78.

The opposite ends of the blade elements 32 and 34 respectively include extended portion which pivotally connect to a walking beam 84. Walking beam 84, in turn, is disposed for rotation relative to the baseblock casting 14 by pivotal connection to a projecting pivot pin or stud 86 which may be integrally formed with the baseblock casting 14 at a location spaced laterally apart from the light entering exposure opening 18. The walking beam 84 may be pivotally retained with respect to the pin 86 by conventional means such as an E ring (not shown). In the preferred mode, the walking beam 84 is pivotally connected at its distal ends to the shutter blades elements 32 and 34 by respective pin members 90 and 92 which extend laterally outward from the walking beam 84. Pin members 90 and 92 are preferably circular in cross section and extend through respective circular openings 94 and 96 in respective blade elements 32 and 34 so as to slidably engage respective arcuate slots or tracks 98 and 100 which may be integrally formed within the baseblock casting 14. The arcuate tracks 98 and 100 operate to inhibit this engagement of the blade elements 32 and 34 from their respective pin members 90 and 92 during operation of the exposure control system. Thus, the walking beam 84 and shutter blade elements 32 and 34 collectively define a blade mechanism with the means for mounting the blade mechanism for displacement including pivot pins 78 and 86.

Drive means for displacing the blade mechanism include a tractive electromagnetic device in the form of a solenoid 102 employed to displace the shutter blades 32 and 34 with respect to each other and the casting 14. The solenoid 102 includes an internally disposed cylindrical plunger unit 104 which retracts inwardly into the body of the solenoid upon energization of the solenoid winding. The solenoid plunger 104 includes an end cap 108 at the outside end thereof together with a vertical slot or groove 110 within the end cap 108 for loosely engaging a pin 106 extending outwardly from the walking beam 84. In this manner, the solenoid plunger 104 is affixed to the walking beam 84 so that longitudinal displacement of the plunger 104 will operate to rotate the walking beam around the pivot pin 86 so as to appropriately displace the shutter blades 32 and 34. The drive means may additionally include a helical compression spring 107 around the plunger 104 so as to continuously urge the end cap 108 outward of the solenoid 102 thereby also continuously urging the blade elements 32 and 34 into positions defining their largest effective aperture over the light entry and exposure opening 18. As will be readily understood, in some shutter blade arrangements it may be preferable to utilize a tension spring in place of compression spring 107 in a manner as shown in an application for U.S. Patent Serial No. 485,128 entitled "Camera with Pivoting Blades" filed July 2, 1974. Thus, with the spring connection herein described, the exposure control system of this invention is biased to continuously urge the shutter blade elements 32 and 34 into an open orientation.

In the present arrangement, the shutter blades 32 and 34 are drawn from their open position to their closed position as shown in FIGS. 2–4 when the solenoid 102 is energized. Consequently, energization of solenoid 02 prevents the shutter blades 32 and 34 from moving towards their maximum aperture opening under the urging of compression spring 107. However, as should be readily understood, the exposure control system of this invention would be equally applicable to photographic systems where the blades 32 and 34 are spring biased in a normally closed position.

Referring now to FIGS. 2–4, there is shown generally at 112 latch means including a latch member having an elongated main body portion 114 disposed for rotation about a pivot pin or shaft 116 integrally molded with the baseblock casting 14. The main body portion 114 includes an integral arm portion 118 extending outwardly therefrom into overlapping relation therewith to ultimately define an integral hook portion 120. Hook portion 120 is adapted for releasable engagement with an integrally molded pin member 126 extending laterally outward from the side of walking beam 84. More specifically, hook portion 120 defines a first edge surface 122 which engages pin member 126 so as to inhibit clockwise rotation of walking beam 84 about pin 86. In addition, hook portion 120 defines a second edge surface 124 which engages the bottom of pin member 126 to inhibit counterclockwise rotation of latch member 112 about its pivot pin 116. A latch release slot is shown generally at 125 and accommodates release of the walking beam 84 from the hook portion 120 in a manner to be subsequently described. Latch member 112 is resiliently biased for yieldable clockwise rotation about pivot pin 116 by a tension spring 128, one end of which engages an integral hook portion 130 extending laterally outward from the main body portion 114 of the latch member 112. The other end of tension spring 128 is grounded with respect to the baseblock casting 14 by a pin member 134.

Referring now to FIGS. 5–8, there is shown an actuator member 136 rotatably disposed between a pair of spaced apart first and second side mounting members 138 and 140. The first and second side members 138 and 140 may be joined together by suitable means to provide a subassembly of components in the following manner. The first side mounting member 138 includes a laterally extending, integrally molded shaft 142 for rotatably mounting the actuator 136 thereon. The shaft 142 extends through a center bore 144 in the actuator 136 wherein the bore 144 is disposed in general concentric relation to an integrally molded shaft 146 extending laterally outward from the actuator member 136. The outside end of shaft 146 is inserted for rotation within a receiving aperture on the second side mounting member 140. The actuator arm member 136 additionally includes a laterally extending, integrally molded arm portion 150 which is resiliently biased into engagement with an edge surface 134 of the main body portion 114 of latch 112. Resilient bias is applied to the actuator member 136 for urging rotation thereof in a clockwise direction as viewed in FIGS. 5–7 by means of a tension spring 154, one end of which connects to an integrally molded hook portion 152 from the actuator member 136 and the other end of which is grounded with respect to the first side mounting member 138 by connection to pin 156.

Figure 6:
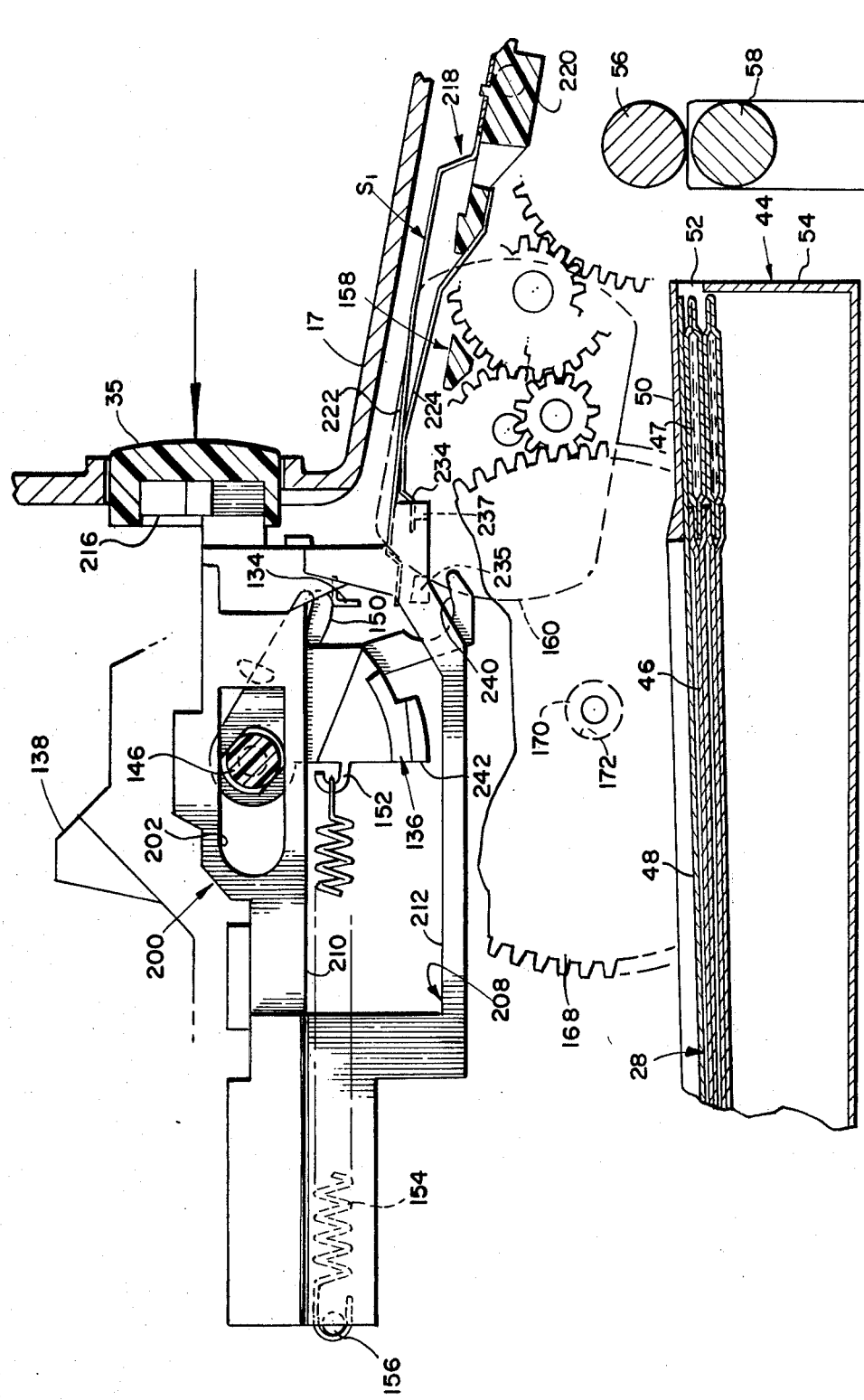
FIG. 6 is a side cross-sectional view of the exposure control and film advance mechanism of FIG. 5 in a different mode of operation.
Figure 7:
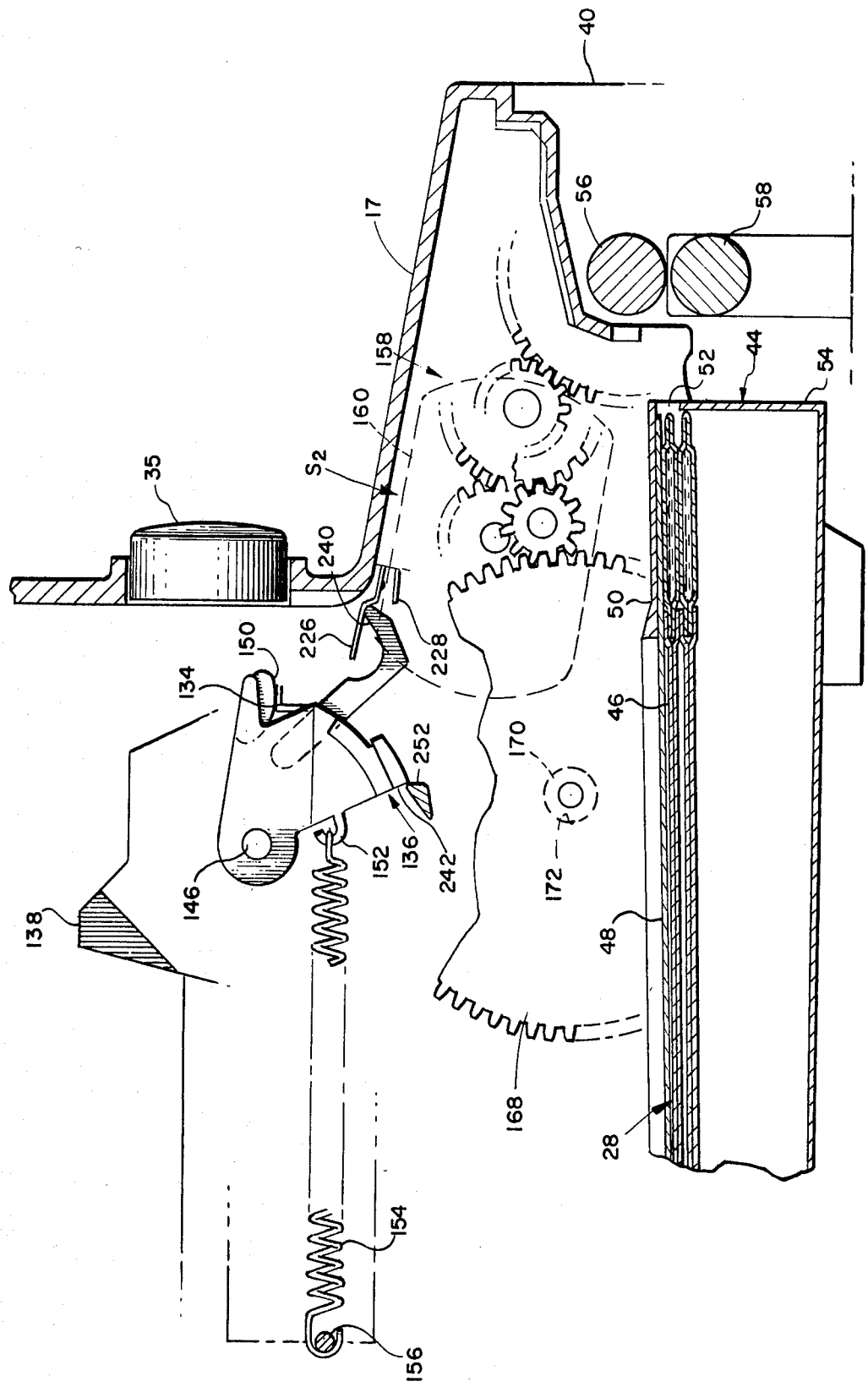
FIG. 7 is a side cross-sectional view of the exposure control and film advance mechanism of FIG. 5 in still another mode of operation.
Figure 11:
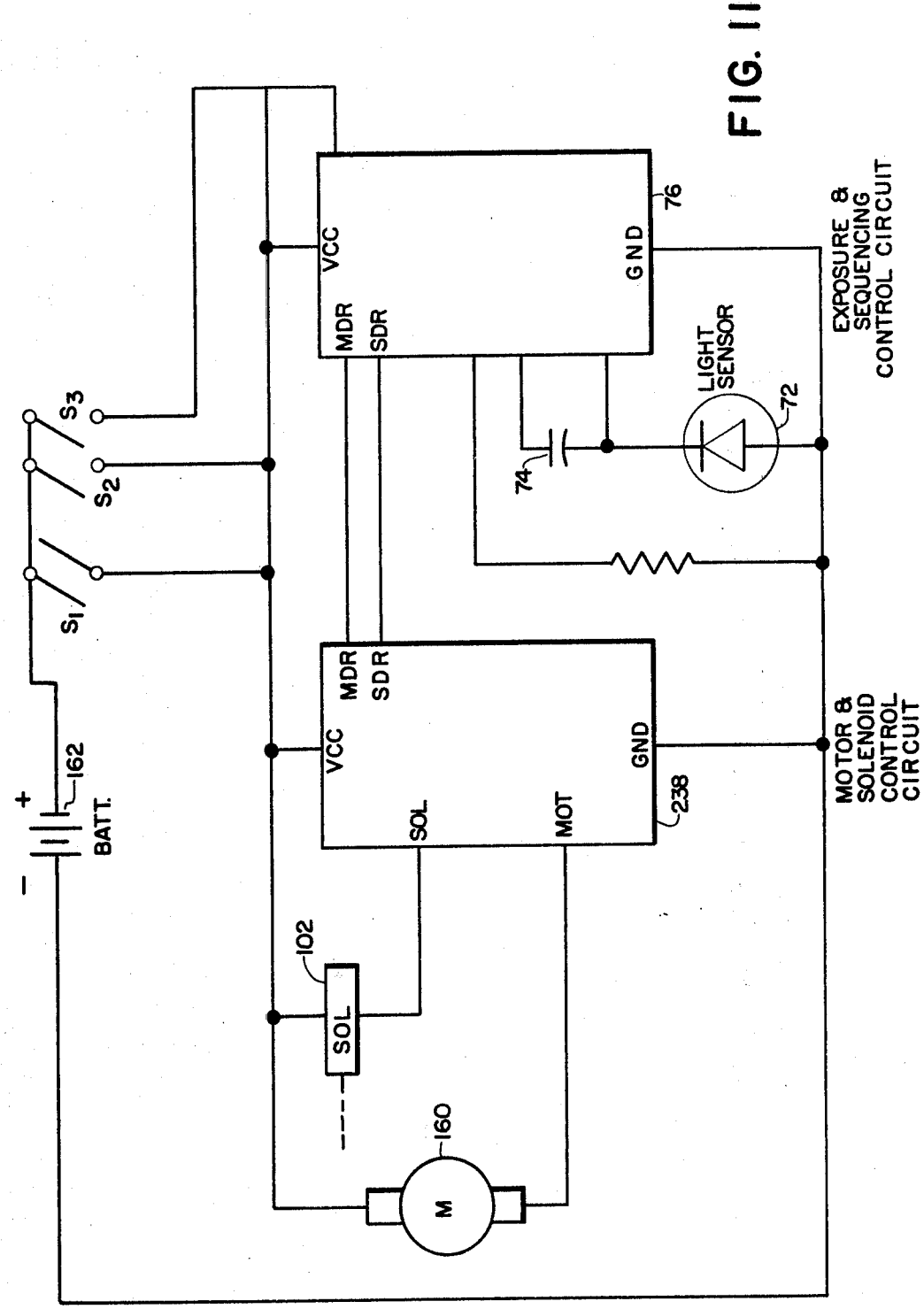
FIG. 11 is a schematic diagram of the electronic circuit of the exposure and film advance system of this invention.

The camera 10 is also provided with a motor driven gear train shown generally at 158 in FIGS. 6 and 7. The gear train is driven by an electrically energized motor 160 which may be energized by an electrical battery 162 shown schematically in FIG. 11 and preferably included within the film cassette 44, as disclosed in U.S. Pat. No. 3,543,662 issued to Irving Erlichmann on Dec. 1, 1970, or from a separate battery source mounted within the camera.

Figure 9:
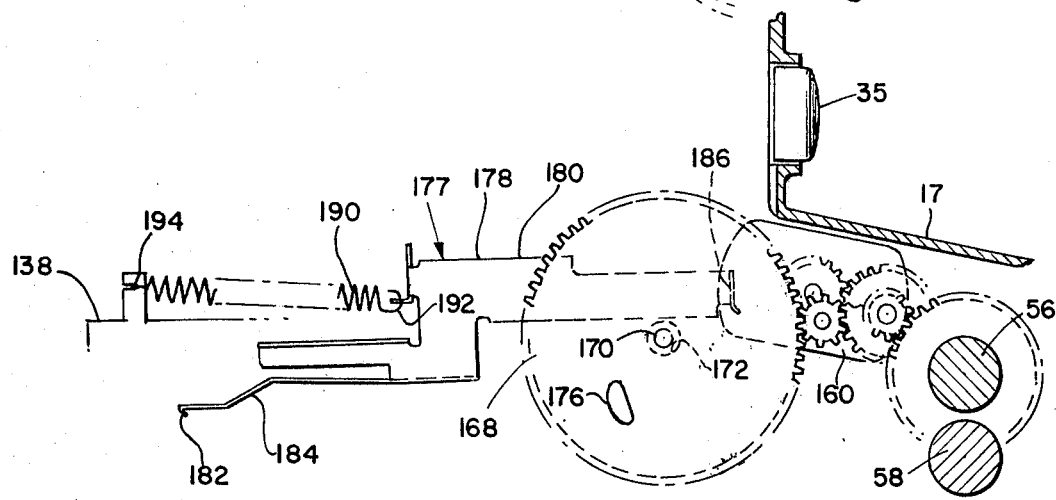
FIG. 9 is a cross-sectional view of the film advance mechanism of this invention.

A sequencing gear or wheel 168 is rotatably driven by the motor gear train 158. The sequencing wheel 168 includes a center bore 172 therethrough disposed for rotation about an integrally molded shaft 170 extending laterally outward from the first side mounting member 138 into engagement with the receiving aperture 174 in the second side mounting member 140. The sequencing wheel 168 includes a profile cam 176 extending outwardly from the side thereof to drive a film advance mechanism as shown generally at 177 in FIG. 9.

The film advance mechanism 177 includes a reciprocating film advance member or device 178 for advancing the forwardmost film unit 46 in the film cassette 44 from the exposure position, through the film exit slot 52, and into the bite of the processing members 56 and 58. The main portion of film advance member 178 is preferably stamped from a thin sheet of metal such as stainless steel and includes an arm 184 attached to and extending rearwardly from a support section 180 to a hook end 182 for engaging a trailing edge of the forwardmost film unit 46. The support section 180 is retained for reciprocal translation with respect to the first mounting member 138 by means not shown. As the film advancing member 178 is advanced forwardly, by means to be described hereinafter, the trailing hook end 182 pulls on the trailing end of the film unit 46 to advance it through the withdrawal slot 52 and into the bite of processing members 56 and 58. Access for the film engaging hook 182 is provided by an elongated slot (not shown) at a trailing end corner of the film cassette 44. The free forward end of support section 180 defines a right angle bend having an end surface 186 adapted to follow the profile cam 176 on wheel 168. The film advance member 178 is resiliently biased to move in a direction away from the processing members 56 and 58 by a tension spring 190, one end of which at 192 connects to the support section 180 while the other end is grounded at 194 with respect to the first side mounting member 138. Thus, the combination of profile cam 176 and biasing spring 190 attached to support section 180 determine the reciprocal translation of the film advancing member 178 with respect to the first and second side mounting members 138, 140. The film advancing mechanism is more fully described in a copending application for U.S. Patent Serial No. 554,778, filed Mar. 3, 1975 by Bruce K. Johnson, et al, entitled "Modular Constructed Sequencing System for Photographic Apparatus".

The shaft 146 of actuator 136 extends through a slot 202 of a slider member 200 so that the slider member 200 may be moved longitudinally within the housing 12 in parallel relation with an inwardly facing surface of the first side mounting member 138 between the limits defined by a semicircular edge 204 and a vertical edge 206 of the slot 202. Slider member 200 additionally includes a large opening 208 defined vertically by upper and lower edges 210 and 212 respectively which extend longitudinally in the slider member 200 below the slot 202. An integrally molded prong 214 extends laterally outward from the inwardly facing surface of the first side mounting member 138 and through the large opening 208 to facilitate engagement between an outside hooked end 215 thereof and a corresponding notch in the second side mounting member 140. The slider member 200 also includes a mounting surface 216 to which the actuator button S1 may be fixedly connected to provide a manually actuated, forwardly biased, push button type switch for initiating the exposure of each of a predetermined number of film units 46 included within the assemblage stored in the film cassette 44. Although the slider member 200 will hereinafter be described as having only two operative positions, it should be readily understood that the slider member 200 may include more than two operative positions as more fully described in a copending application for U.S. Patent Serial No. 648,673 entitled "Exposure Inhibiting Film Counter", By B. K. Johnson, filed Jan. 13, 1976.

Figure 5:
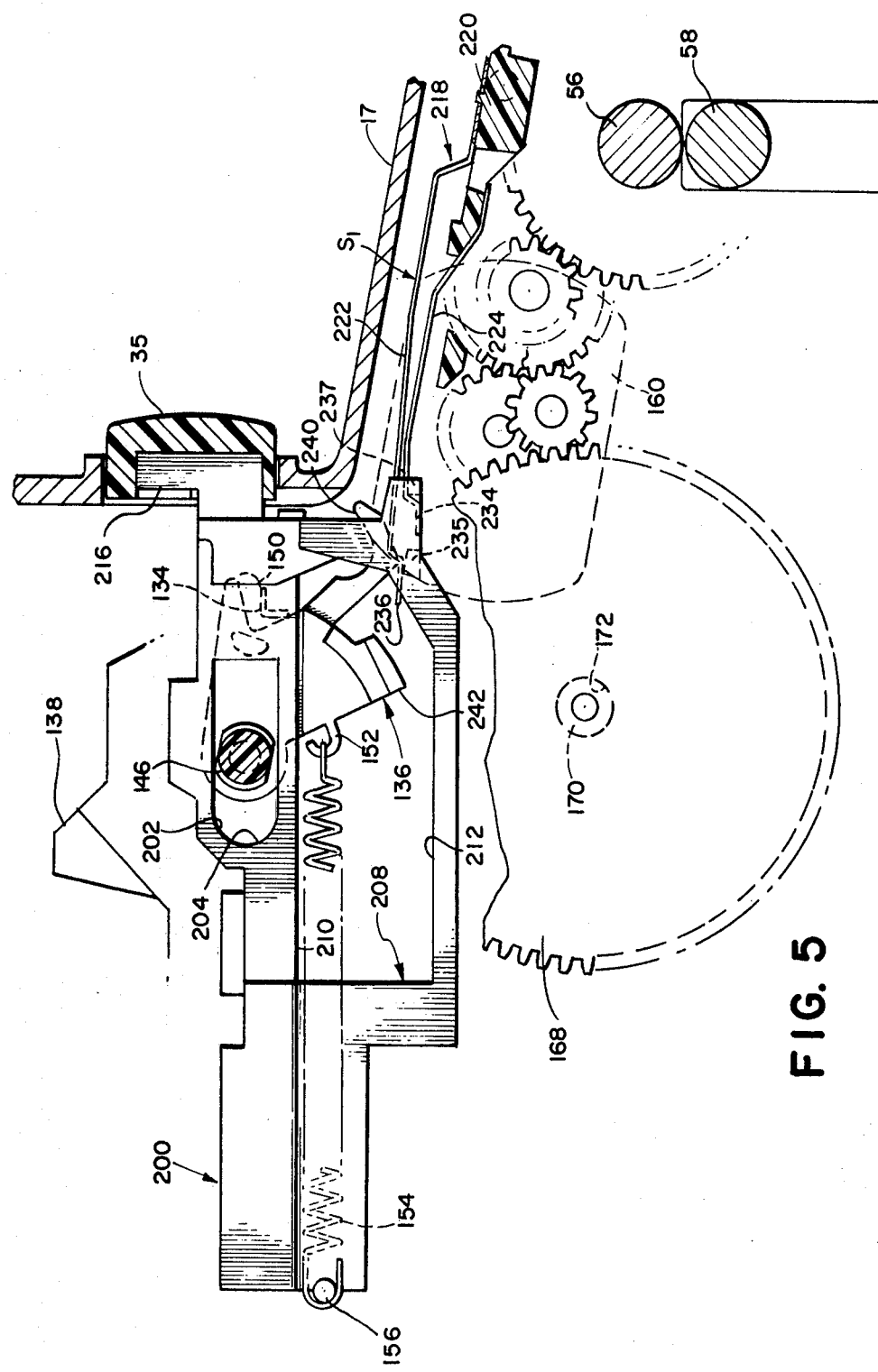
FIG. 5 is a side cross-sectional view of another portion of the exposure control and film advance mechanism of this invention.
Figure 8:
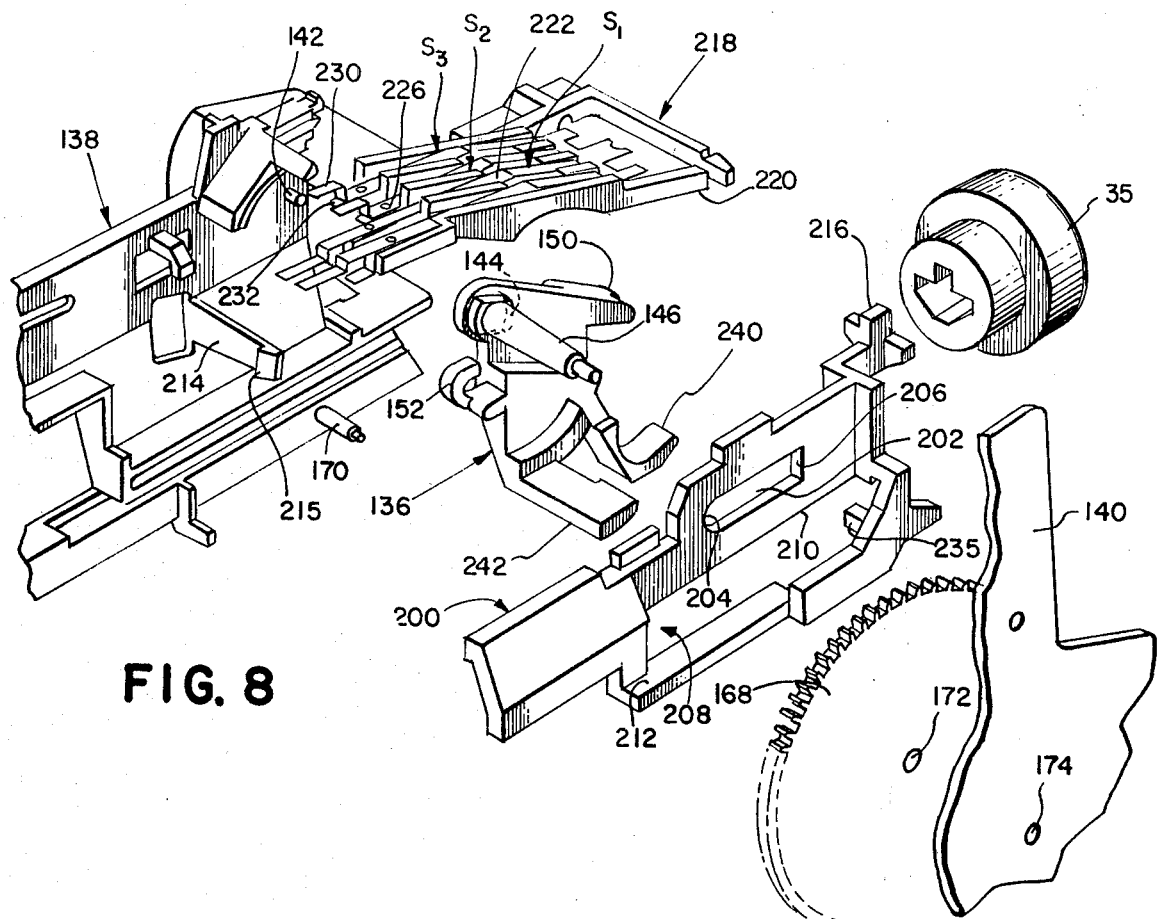
FIg. 8 is an exploded perspective of another portion of the exposure control mechanism of this invention.

Referring now to FIGS. 5, 6 and 8, there is shown generally at 218 a switch block arrangement comprising a molded switch block 220 to which are connected three pairs of spaced apart, resilient terminal leaves defining three switches S1, S2 and S3. Although a fourth switch is also illustrated as part of the switch block arrangement 218, its function is not relevant to the instant disclosure and hence will not be further described herein. Switch S1 comprises an upper resilient terminal leaf 222 in spaced apart relation to a lower resilient terminal leaf 224 which leaves are respectively bent at 236 and 234 for respective engagement with a pair of integrally molded projections 235 and 237 extending laterally outward from the side of slider member 200 for cooperation in a manner to be subsequently described in greater detail herein. Similarly, switch S2 comprises an upper resilient leaf 226 spaced apart from a lower resilient leaf 228 to define a switch in parallel electrical connection with switch S1 as shown in the schematic diagram of FIG. 11. In like manner, switch S3 comprises an upper resilient terminal leaf 230 biased in spaced apart relation to a lower resilient terminal leaf 232 to provide a binary logic input signal from the battery 162 to the exposure sequencing control circuit 76. As is readily apparent, switches S1 and S2 provide the requisite connection for the battery 162 to energize the exposure sequencing control circuit 76 as well as a motor and solenoid control circuit 238 together with its associated solenoid 102 and motor 160.

Referring now back to FIGS. 7 and 8, there is shown an integrally molded depending arm portion 240 extending from the actuator 136 for engagement with the upper resilient terminal leaves 226 and 230 of respective switches S2 and S3 upon counterclockwise rotation of the actuator 136 about the shaft 142. Thus, counterclockwise rotation of the actuator 136 against the bias of tension spring 154 operates to deflect the upper resilient terminal leaves 226 and 230 from engagement with their respective lower terminal leaves 228 and 232 so as to open switches S2 and S3. In the preferred embodiment, the leading edge profile of depending arm portion 240 is configured in a manner operating to open switch S3 prior to opening switch S2 when rotated in a counterclockwise direction, while conversely permitting switch S2 to close prior to switch S3 when rotated in a clockwise direction. Actuator member 136 additionally includes an integrally molded cam follower portion 242 extending laterally outward from the side thereof for cooperative engagement with a second profile cam 252 on the internal surface of sequencing wheel 168. Thus, as is readily apparent, clockwise rotation of sequencing wheel 168 operates to rotate profile cam 252 into engagement with cam follower portion 242 to rotate actuator 136 in a counterclockwise direction about the shaft 142 and against the bias of tension spring 154.

Referring back to FIG. 2, there is additionally shown a shock stabilizing means including an inertia member 254 connected for rotation with respect to the baseblock casting 14 by a pivot pin 258. The inertial member 254 includes a main body portion 256 from which extends upwardly an integral arm portion 260, the outward tip of which is located in the locus of travel of the laterally extending pin 126 from the walking beam. Inertia member 254 is biased for rotation in a counterclockwise direction about pivot pin 258 by a leaf spring 262, one end of which engages the main body portion 256 at 264 and the other end of which is grounded with respect to the baseblock casting at 266. In addition, the main body portion 114 of the latch includes an integral depending arm portion 270 extending downwardly therefrom in overlying relation with respect to the pivot pin 258 so as to inhibit the inertia member 254 from sliding axially off the pivot pin 258 regardless of the latch position.

In order to initiate exposure of the forwardmost film unit 46, the user must depress the actuator button 35 attached to the mounting surface 216 of slider member 200 so as to displace the slider rearwardly along the shaft 146. In this manner, the integrally molded projections 235 and 237 from the slider member 200, respectively, engage bent portions 236 and 234 at respective terminal leaves 222 and 224 so as to displace the terminal leaves into contact with each other as shown in FIG. 6, thereby closing switch S1 and energizing control circuits 76 and 238. Solenoid 102 is also energized in correspondence with the control circuits so as to effect an inward displacement of plunger 104, thereby rotating the walking beam 84 in a counterclockwise direction so as to displace the pin 126 out of engagement with the latching surfaces 122 and 124 and into alignment with the latch release slot 125 as shown in FIG. 3. The latch member 112 is thereafter rotated in a counterclockwise direction about the pivot pin 116 by the actuator member 136 which arm 150 engages the edge surface 134 of the latch. The actuator member 136 is rotated in a counterclockwise direction by the tension spring 154 so as to overcome the force of tension spring 128.

Clockwise rotation of actuator member 136 also operates to bring the depending end portion 240 thereof sequentially out of engagement with the upper resilient terminal leaves 226 and 230 of respective switches S2 and S3. The upper terminal leaves 226 and 230 are therafter deflected into respective engagement with the lower terminal leaves 228 and 232 to respectively close the switches S2 and S3. In the preferred mode switch S2, which operates to connect battery power to the control circuits 76 and 238, closes prior to switch S3 which operates to connect a binary input logic signal from the battery 162 to the exposure and sequencing control circuit 76. Thus, as is now readily apparent, with switches S2 and S3 closed, the user may release the button 35 so as to permit the slider member 200 to translate forward under the influence of tension spring 154. The resilient terminal leaves 222 and 224 of switch S1 also spring apart in correspondence with forward translation of sliding member 200. Thus, the terminal leaves 224 and 226 of switch S1 are arranged to be opened and closed in correspondence respectively with the depression and release of button 35 so as to collectively define a pushbutton type switch.

As is now readily apparent, the aforementioned counterclockwise rotation of the latch member 112 under the influence of the actuator member 136 and its associated tension spring 154 also simultaneously operates to unlatch the walking beam 84 to facilitate clockwise rotation thereof under the influence of compression spring 104. Simultaneous application of the binary input logic signal to the exposure and sequencing control circuit 76 by the switch S3 operates to ultimately effect a switching operation by the motor and solenoid control circuit 238 to deenergize the solenoid 102 and thereby commence an exposure interval. The shutter blade elements 32 and 34 are thereafter moved by the walking beam 84 and compression spring 104 in directions which operate to progressively enlarge the effective aperture over the light entering exposure opening 18. Rotation of the walking beam 84 as previously discussed effects a simultaneous linear and angular movement of the shutter blade elements 32 and 34 about the pivot pin 78 so that the photocell sweep secondary apertures 64 and 66 define a corresponding progressively enlarging aperture over the photoresponsive element 72. Thus, from the instant the photographic cycle is initiated upon the deenergization of solenoid 102, the photoresponsive element 72 provides a time varying response corresponding to the intensity of scene light incident thereon. The capacitor 74 operates in conjunction with the photoresponsive element 72 to provide an input signal to the exposure and sequencing control circuits 76 which is representative of the time integration of the scene light intensity incident to the photoresponsive element 72. Upon reaching a predetermined exposure of the forwardmost film unit 46, the exposure and sequencing control circuit 76 signals the motor and solenoid control circuit 238 to again energize the solenoid 102 to retract the plunger 104 therein and rotate the walking beam 84 in a counterclockwise direction back to the scene light blocking arrangement as shown in FIG. 4 to terminate the exposure interval.

Upon termination of the exposure interval in the aforementioned manner, the exposure and sequencing control circuit 76 signals the motor and solenoid control circuit 238 to energize the motor 160 which operates to rotate the sequencing wheel 168 in a clockwise direction by way of the motor driven gear train 158. Rotation of the sequencing wheel 168 operates to rotate the profile cam 176 thereon into engagement with the end surface of 186 defined by the right angle bend at the free forward end of the film advance support section 180. The end surface 186 is held in engagement with the cam 176 by the rearward force supplied to the film advance mechanism 177 by the biasing tension spring 190. As the film advance mechanism 70 is advanced forwardly by the cam 176 on wheel 168, the trailing hook end 182 pulls on the trailing end of the film unit 46 to advance it through the withdrawal slot 52 and into the bite of pressure applying members 56 and 58. The film unit 46 is thereafter processed by the pressure applying members 56 and 58 and ejected from the camera apparatus 10 by way of the film withdrawal slot 42 and the film loading access door 40. Continued rotation of the sequencing wheel 168 operates to move the profile cam 176 out of engagement with the end surface 186 of the film advance mechanism 177 thereby permitting the film advance mechanism to retract rearwardly under the influence of tension spring 190.

Continued rotation of the sequencing wheel 168 subsequent to the ejection of a processed film unit operates to rotate the profile cam 252 into engagement with the integral cam follower portion 242 of actuator member 136 so as to rotate the actuator member in a counterclockwise direction as viewed in FIGS. 5-8 against the biasing influence of tension spring 154. Counterclockwise rotation of actuator member 136 in turn operates to rotate depending arm portion 240 into sequential engagement with upper terminal leaves 226 and 230 of respective switches S2 and S3. Again in the preferred mode, switch S3, is arranged to be opened prior to switch S2 in order that the binary logic input control signal may be disconnected prior to the deenergization of the control circuits 76 and 238. As is now readily apparent, opening switches S2 and S3 deenergizes the motor 160 which continues to coast until profile cam 252 on wheel 168 has been rotated out of engagement with cam follower 242 on actuator member 136.

Counterclockwise rotation of the actuator member 136 and its associated arm 150 accommodates clockwise rotation of the latch member 112 about pivot pin 116 under the operative influence of tension spring 128. Thus, the latch release slot 125 is rotated past the laterally extended pin 126 from the walking beam 84 so that the latch member 112 assumes the position as shown in FIG. 2. Once the latch is rotated into the latching position, switches S2 and S3 are arranged to open so as to cause the solenoid 112 to deenergize and effect a limited clockwise rotation of the walking beam 84 under the operative influence of compression spring 104 so that pin 126 engages latch surfaces 122 and 124. In this manner, the shutter blade mechanism is automatically relatched in concert with the opening of switches S2 and S3 so as to deenergize the control circuits 76 and 238 together with the solenoid 104 and motor 160. Should the user fail to release the button 35, the exposure and sequencing circuit 76 will nevertheless operate to deenergize the solenoid 102 in motor 160 in the aforementioned manner.

Should the camera apparatus 10 be shaken, dropped or otherwise shocked in a manner causing walking beam 84 to rotate in a counterclockwise direction against the operative influence of compression spring 104, there could occur an unlatching of the shutter blade mechanism in the manner as previously described. Thus, as a precaution against the accidental unlatching of the shutter blade mechanism, there is provided the inertia member 254 for engaging the pin 126 of the walking beam 84 upon a sudden shocking of the walking beam 84. As should be readily understood, the inertia member 254 must either be arranged to initially engage the pin 126 or be slightly spaced apart therefrom to allow the walking beam 84 to move slightly before engaging the inertia member 254. In this manner, kinetic energy imparted to the walking beam upon the shocking thereof is subsequently transferred to the inertia member 254 by the pin 126. Transfer of the kinetic energy from the walking beam 84 to the inertia member 254 operates to stop the walking beam 84, in arrangements where the inertia member is initially spaced apart from the pin 126, while imparting a clockwise rotation to the inertia member 254 as shown in FIG. 10. The inertia member 254 is resiliently biased by the leaf spring 262 to rebound back and engage the pin 126 of the walking beam thereby again transferring the remaining kinetic energy from the inertia member back to the walking beam so as to inhibit the walking beam from accidentally moving into the unlatched position.

Under severe or repeated shock the walking beam 184 may again rebound back into engagement with the inertia member 254 causing another reverberation thereof in the above-described manner. The actual number of consecutive reverberations may depend upon the severity of shock to which the camera is subjected; however, the reverberations will gradually decrease until the walking beam is returned to its latched position as shown in FIG. 2.

In this manner, the shutter blade mechanism can be prohibited from accidentally unlatching as a result of sudden shock, while during normal operation the inertia member 254 is simply rotated in a counterclockwise direction out of the way by the walking beam pin 126 upon the energization of solenoid 102.

The improvement of this invention, as seen in FIGS. 2-4, relates to means for inhibiting the operative influence of the shock stabilizing means on the walking beam 84 during the above described exposure cycle. This inhibiting means comprises an integral member 268 projecting laterally outward from the side of the main body portion 114 of latch member 112 into overlapping relation with the underlying edge of inertia member 254. Thus when latch member 112 is rotated into the unlatched position in the aforementioned manner as shown in FIG. 4, projecting member 268 also rotates in a counter clockwise direction in correspondence with latch member 112 so as to engage the underlying edge of the inertia member 254 and thereafter rotate the inertia member 254 in a clockwise direction about the pivot pin 258. In this manner, the inertia member 254 is rotated and maintained out of the locus of travel for the walking beam 84 during an exposure cycle permitting unobstructed rotation of the walking beam 84. Otherwise, the walking beam 84 would strike the inertia member 254 upon closing of the blade elements resulting in undesirable vibrations to the blade mechanism. As is now readily apparent, subsequent clockwise rotation of the latch member 112 into the latched position of FIG. 2 permits counterclockwise rotation of the inertia member 254 about its pivot pin 258 under the operative influence of leaf spring 262. In this manner, the inertia member 254 is returned to its initial position as shown in FIG. 2.

Since certain changes may be made in the above-described embodiment without departing from the scope of the invention herein involved, it is intended that all matter contained in the above description or shown in the accompanying drawings shall be interpreted as illustrative and not in a limiting sense.

What is claimed is:

1. A photographic camera having means for mounting photographic film material at a given focal plane, said camera comprising:

a blade mechanism;

means for mounting said blade mechanism for displacement between at least one blocking arrangement precluding transmission of scene light to the focal plane and an unblocking arrangement defining at least one aperture value structured for transmission of scene light to the focal plane;

drive means actuable for displacing said blade mechanism between its said arrangements;

latch means for initially retaining said blade mechanism in one of its said arrangements;

means at least in part electrically energizable for actuating said drive means to effect the displacement of said blade mechanism from its said arrangement wherein it is retainable by said latch means to another of its said arrangements and then back to its said arrangement wherein it is retainable by said latch means to define an exposure cycle of said blade mechanism, said latch means being structured for displacement responsive to actuation of said drive means to effect its normal release of said blade mechanism to facilitate the movement of said blade mechanism under the influence of said drive means to define said exposure cycle, said blade mechanism also being responsive to a sudden shocking thereof for movement from its said arrangement wherein it is retainable by said latch means to another of its said arrangements; and shock stabilizing means responsive to said shocking of said blade mechanism not resulting from said actuation of said drive means for prohibiting the release of said blade mechanism by said latch means, said latch means including means responsive to said displacement of said latch means to effect said normal release of said blade mechanism for inhibiting the operative influence of said shock stabilizing means on said blade mechanism until said blade mechanism is returned to its said arrangement wherein it is retainable by said latch means.

2. The camera of claim 1 wherein: said mounting means mounts said blade mechanism for movement to a third arrangement in addition to said arrangement wherein it is retainable by said latching means and said other arrangement, its said third arrangement being an arrangement wherein said blade mechanism is further displaced away from its said other arrangement than when in its said arrangement wherein it is retainable by said latch means to its said third arrangement; said shock stabilizing means includes an inertial member, together with means for mounting the inertial member for limited displacement with respect to the camera, said inertial member having a portion thereof normally disposed for engagement with said blade mechanism upon said shocking of said blade mechanism, said shocking of said blade mechanism operating to cause said inertial member to move away from its said normally disposed position and thereafter rebound back into its said normally disposed position to engage said blade mechanism in said arrangement wherein it is retainable by said latch means when said drive means remains unactuated; and said means for inhibiting the operative influence of said shock stabilizing means includes at least one member which is displaceable in correspondence with said latch means when said latch means effects said normal release of said blade mechanism, for engaging and urging said inertial member to move away from its said normally disposed position to another position wherein said inertial member is at least out of interfering relation with said third arrangement of said blade mechanism, said one member thereafter operating to maintain said inertial member in its said other position at least until said blade mechanism is returned to said third arrangement at the termination of said exposure cycle.

3. The camera of claim 2 wherein said means for mounting said inertial member rotatably mounts said inertial member and wherein there are also included means for resiliently biasing rotation of said inertial member in the direction of said rebound, said one member operating to rotate said inertial member from its said normally disposed position against the resilient bias of said biasing means and said inertial member thereafter being returned to its said normally disposed position by said biasing means.

4. The camera of claim 1 wherein: said other of said arrangements of said blade mechanism is said unblocking arrangement; said mounting means mounts said blade mechanism for movement between two blocking arrangements, the first of said blocking arrangements being said arrangement wherein it is retainable by said latch means and the second of said blocking arrangements being an arrangement wherein said blade mechanism is further displaced away from its said unblocking arrangement than when in its said first blocking arrangement and the release of said blade mechanism by said latch means is responsive to a displacement of said blade mechanism from its said first blocking arrangement to its said second blocking arrangement; said shock stabilizer means includes an inertial member, together with means for mounting the inertial member for limited displacement with respect to the camera, said inertial member having a portion thereof normally disposed for engagement with said blade mechanism upon said shocking of said blade mechanism, said shocking of said blade mechanism operating to cause said inertial member to move away from its normally disposed position and thereafter rebound back into its said normally disposed position to engage said blade mechanism in said first blocking arrangement when said drive means remains unactuated; and said means for inhibiting the operative influence of said stabilizing means includes at least one member which is displaceable in correspondence with said latch means when said latch means effects said normal release of said blade mechanism, for engaging said inertial member and causing said inertial member to move away from its said normally disposed position to another position wherein said inertial member is at least out of interfering relation with said first and second blocking arrangements of said blade mechanism, said one member thereafter operating to maintain said inertial member in its said other position at least until said blade mechanism is returned to said second blocking arrangement at the termination of said exposure cycle.

5. The camera of claim 4 wherein said means for mounting said inertial member rotatably mounts said inertial member and wherein there are also included means for resiliently biasing rotation of said inertial member in the direction of said rebound, said one member operating to rotate said inertial member from its said normally disposed position against the resilient bias of said biasing means and said inertial member thereafter being returned to its said normally disposed position by said biasing means.

6. The photographic camera of claim 1 wherein:
said latch means includes a latch member mounted for displacement between a first position wherein said latch member retains said blade mechanism and a second position wherein said latch member releases said blade mechanism;
said stabilizing means include an inertia member mounted for displacement between a first position wherein it is disposed in the path of movement of at least a portion of said blade mechanism as said blade mechanism moves from its said arrangement wherein it is retainable by said latch means to another of its said arrangements and then back to its said arrangement wherein it is retainable by said latch means to define said exposure cycle and a second position wherein it is disposed out of said path of movement; and said means for inhibiting the operative influence of said shock stabilizing means includes means responsive to the displacement of said latch member from its said first position to its said second position to move said inertia member from its said first position to its said second position and thereafter responsive to the displacement of said latch member from its said second position back to its said first position to move said inertia member from its said second position back to its said first position.

* * * * *

UNITED STATES PATENT OFFICE
CERTIFICATE OF CORRECTION

Patent No. 4,017,876          Dated April 12, 1977

Inventor(s) Edward H. Coughlan, et al.

It is certified that error appears in the above-identified patent and that said Letters Patent are hereby corrected as shown below:

Column 14, line 67, after "means" insert --and the release of said blade mechanism by said latch means is responsive to a displacement of said blade mechanism from its said arrangement wherein it is retainable by said latch means--

*Signed and Sealed this*

*Twenty-fifth* Day of *October 1977*

[SEAL]

*Attest:*

RUTH C. MASON      LUTRELLE F. PARKER
*Attesting Officer*      *Acting Commissioner of Patents and Trademarks*